United States Patent
Murali et al.

(10) Patent No.: US 11,073,894 B2
(45) Date of Patent: Jul. 27, 2021

(54) SYSTEM POWER MANAGEMENT FOR PERIPHERAL COMPONENT INTERCONNECT EXPRESS (PCIE)-BASED DEVICES

(71) Applicant: QUALCOMM Incorporated, San Diego, CA (US)

(72) Inventors: Dilip Venkateswaran Murali, San Diego, CA (US); Murali Krishna, San Diego, CA (US); Thiyagarajan Selvam, San Diego, CA (US); Sujeev Dias, San Marcos, CA (US); Tony Truong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/931,307

(22) Filed: May 13, 2020

(65) Prior Publication Data

US 2020/0371578 A1 Nov. 26, 2020

Related U.S. Application Data (60) Provisional application No. 62/852,757, filed on May 24, 2019, provisional application No. 62/855,197, filed on May 31, 2019.

(51) Int. Cl.
*G06F 1/3234* (2019.01)
*G06F 13/42* (2006.01)

(52) U.S. Cl.
CPC ........ *G06F 1/3253* (2013.01); *G06F 13/4221* (2013.01); *G06F 2213/0026* (2013.01)

(58) Field of Classification Search
CPC .................. G06F 1/3253; G06F 13/4221

USPC ......................................................... 713/323
See application file for complete search history.

(56) References Cited

U.S. PATENT DOCUMENTS

| | | | |
|---|---|---|---|
| 5,982,814 A | 11/1999 | Yeh et al. | |
| 6,222,388 B1 * | 4/2001 | Bridgewater, Jr. | H03K 19/0016 326/57 |
| 6,766,460 B1 * | 7/2004 | Evoy | G06F 1/3203 712/E9.068 |
| 7,136,953 B1 | 11/2006 | Bisson et al. | |
| 7,137,018 B2 * | 11/2006 | Gutman | G06F 1/3209 713/323 |
| 7,461,195 B1 | 12/2008 | Woodral | |

(Continued)

OTHER PUBLICATIONS

PCI Express Base Specification Revision 3.0 Nov. 10, 2010 (Year: 2010).*

(Continued)

*Primary Examiner* — Paul R. Myers
(74) *Attorney, Agent, or Firm* — Withrow & Terranova, PLLC (57) ABSTRACT

Systems and methods for power management for Peripheral Component Interconnect express (PCIE) devices allow PCIE termini to enter advanced low-power states while a PCIE link is idle. These advanced low-power states may include scaling a clock frequency up through a complete shutdown of power rails and clocks within the PCIE terminus. Additionally, use of a wakeup signal such as a clock request (CLKREQ or CLKREQ #) signal may allow the terminus to wake relatively quickly and resume operation so as to avoid degradation of the user experience or loss of data.

19 Claims, 6 Drawing Sheets

(56) References Cited

U.S. PATENT DOCUMENTS

| | | | |
|---|---|---|---|
| 7,752,473 B1* | 7/2010 | Kwa | G06F 1/3215 |
| | | | 713/323 |
| 8,181,059 B2 | 5/2012 | Millet et al. | |
| 9,213,393 B2 | 12/2015 | Cooper et al. | |
| 10,707,877 B1* | 7/2020 | Majumder | H03L 7/141 |
| 2004/0024919 A1* | 2/2004 | Stager | G06F 21/80 |
| | | | 710/1 |
| 2004/0260960 A1* | 12/2004 | Hilgendorf | G06F 1/3203 |
| | | | 713/320 |
| 2006/0047984 A1* | 3/2006 | Ho | G06F 1/3237 |
| | | | 713/300 |
| 2006/0085586 A1 | 4/2006 | Birmiwal et al. | |
| 2006/0262839 A1* | 11/2006 | Tseng | H04L 12/12 |
| | | | 375/219 |
| 2008/0022024 A1 | 1/2008 | Mao | |
| 2009/0006877 A1* | 1/2009 | Lubbers | G06F 3/0634 |
| | | | 713/323 |
| 2009/0106476 A1* | 4/2009 | Jenkins | G06F 13/4221 |
| | | | 710/315 |
| 2009/0201082 A1* | 8/2009 | Smith | G06F 1/3203 |
| | | | 327/544 |
| 2009/0204831 A1* | 8/2009 | Cousson | G06F 1/324 |
| | | | 713/322 |
| 2010/0274953 A1* | 10/2010 | Lee | G06F 1/266 |
| | | | 711/103 |
| 2011/0276816 A1 | 11/2011 | Cooper et al. | |
| 2012/0140286 A1* | 6/2012 | Ueda | G06K 15/1817 |
| | | | 358/1.16 |
| 2012/0324258 A1* | 12/2012 | Branover | G06F 1/3275 |
| | | | 713/320 |
| 2013/0107716 A1 | 5/2013 | Volpe et al. | |
| 2014/0019654 A1 | 1/2014 | Trivedi et al. | |
| 2014/0082251 A1 | 3/2014 | Li | |
| 2014/0108840 A1 | 4/2014 | Imao | |
| 2014/0195833 A1* | 7/2014 | Wang | G06F 1/3203 |
| | | | 713/320 |
| 2014/0269495 A1 | 9/2014 | Frantz et al. | |
| 2014/0372777 A1 | 12/2014 | Reller et al. | |
| 2015/0186157 A1* | 7/2015 | Therien | G06F 1/324 |
| | | | 713/100 |
| 2015/0309552 A1* | 10/2015 | Vanka | G06F 1/324 |
| | | | 713/322 |
| 2016/0050301 A1* | 2/2016 | Dreps | H04L 69/323 |
| | | | 370/458 |
| 2016/0370844 A1* | 12/2016 | Kumar | G06F 3/0416 |
| 2017/0046075 A1 | 2/2017 | Fuxa et al. | |
| 2017/0269675 A1 | 9/2017 | Klacar et al. | |
| 2017/0280385 A1 | 9/2017 | Klacar et al. | |
| 2018/0150125 A1* | 5/2018 | HomChaudhuri | G06F 1/3287 |
| 2018/0253138 A1 | 9/2018 | Bakshi et al. | |
| 2020/0008144 A1 | 1/2020 | Klacar et al. | |
| 2020/0166985 A1* | 5/2020 | He | G06F 1/324 |

OTHER PUBLICATIONS

International Search Report and Written Opinion for International Patent Application No. PCT/US2020/032864, dated Aug. 3, 2020, 14 pages.

* cited by examiner

FIG. 5

SYSTEM POWER MANAGEMENT FOR PERIPHERAL COMPONENT INTERCONNECT EXPRESS (PCIE)-BASED DEVICES

PRIORITY APPLICATIONS

The present application claims priority to U.S. Provisional Patent Application Ser. No. 62/852,757, filed May 24, 2019 and entitled "SYSTEM POWER MANAGEMENT FOR PERIPHERAL COMPONENT INTERCONNECT EXPRESS (PCIE)-BASED DEVICES," which is incorporated herein by reference in its entirety.

The present application also claims priority to U.S. Provisional Patent Application Ser. No. 62/855,197, filed May 31, 2019 and entitled "SYSTEM POWER MANAGEMENT FOR PERIPHERAL COMPONENT INTERCONNECT EXPRESS (PCIE)-BASED DEVICES," which is incorporated herein by reference in its entirety.

BACKGROUND

I. Field of the Disclosure

The technology of the disclosure relates generally to a Peripheral Component Interconnect express (PCIE) link and, more particularly, to controlling power states for termini associated with a PCIE link.

II. Background

Computing devices have become common throughout modern society. The popularity of computing devices is propelled, in part, by the increased functionality and power of the computing devices. The diverse functionality and increased power is provided by the ability of the processing unit to communicate with diverse peripherals. These peripherals, such as a wireless modem or a graphics card, may be internal to a computing device, or peripherals such as a display, a sensor, or the like may be external to the computing device. To achieve this myriad functionality, various communication protocols and standards have evolved that allow integrated circuits (ICs) to communicate with one another. One popular communication standard is the Peripheral Component Interconnect (PCI) standard, which has a variety of permutations. One of the most popular permutations of the PCI standard is the PCI express (PCIE) standard. Concurrently, there remains pressure to reduce power consumption in computing devices.

SUMMARY OF THE DISCLOSURE

Aspects disclosed in the detailed description include systems and methods for power management for Peripheral Component Interconnect express (PCIE)-based devices. In particular, exemplary aspects of the present disclosure allow PCIE termini to enter advanced low-power states while a PCIE link is idle. These advanced low-power states may include scaling a clock frequency up through a complete shutdown of power rails and clocks within a PCIE terminus. Additionally, use of a wakeup signal such as a clock request (CLKREQ or CLKREQ #) signal may allow the PCIE terminus to wake relatively quickly and resume operation so as to avoid degradation of the user experience or loss of data.

In this regard in one aspect, a method for reducing power consumption for a PCIE terminus is disclosed. The method includes, after entry into a low-power state, starting a timer. The method also includes, when the timer expires without activity on an associated PCIE link, entering at least a partial system power collapse at the PCIE terminus.

In another aspect, a device including a root complex is disclosed. The root complex includes a PCIE interface configured to be coupled to a PCIE link. The root complex also includes a timer. The root complex also includes a control circuit. The control circuit is configured to, after entry into a low-power state, start the timer. The control circuit is also configured to, when the timer expires without activity on the PCIE link, enter at least a partial system power collapse.

In another aspect, a device including an endpoint is disclosed. The endpoint includes a PCIE interface configured to be coupled to a PCIE link. The endpoint also includes a timer. The endpoint also includes a control circuit. The control circuit is configured to, after entry into a low-power state, start the timer. The control circuit is also configured to, when the timer expires without activity on the PCIE link, enter at least a partial system power collapse.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for power management for Peripheral Component Interconnect express (PCIE)-based devices. In particular, exemplary aspects of the present disclosure allow PCIE termini to enter advanced low-power states while a PCIE link is idle. These advanced low-power states may include scaling a clock frequency up through a complete shutdown of power rails and clocks within a PCIE terminus. Additionally, use of a wakeup signal such as a clock request (CLKREQ or CLKREQ #) signal may allow the PCIE terminus to wake relatively quickly and resume operation so as to avoid degradation of the user experience or loss of data.

Before addressing specifics of how a PCIE terminus is placed into an advanced low-power state, a brief overview of PCIE architecture is provided with reference to FIGS. 1A-3. A discussion of the sequence through which a PCIE terminus is placed in an advanced low-power state begins below with reference to FIG. 4.

Figure 1A:
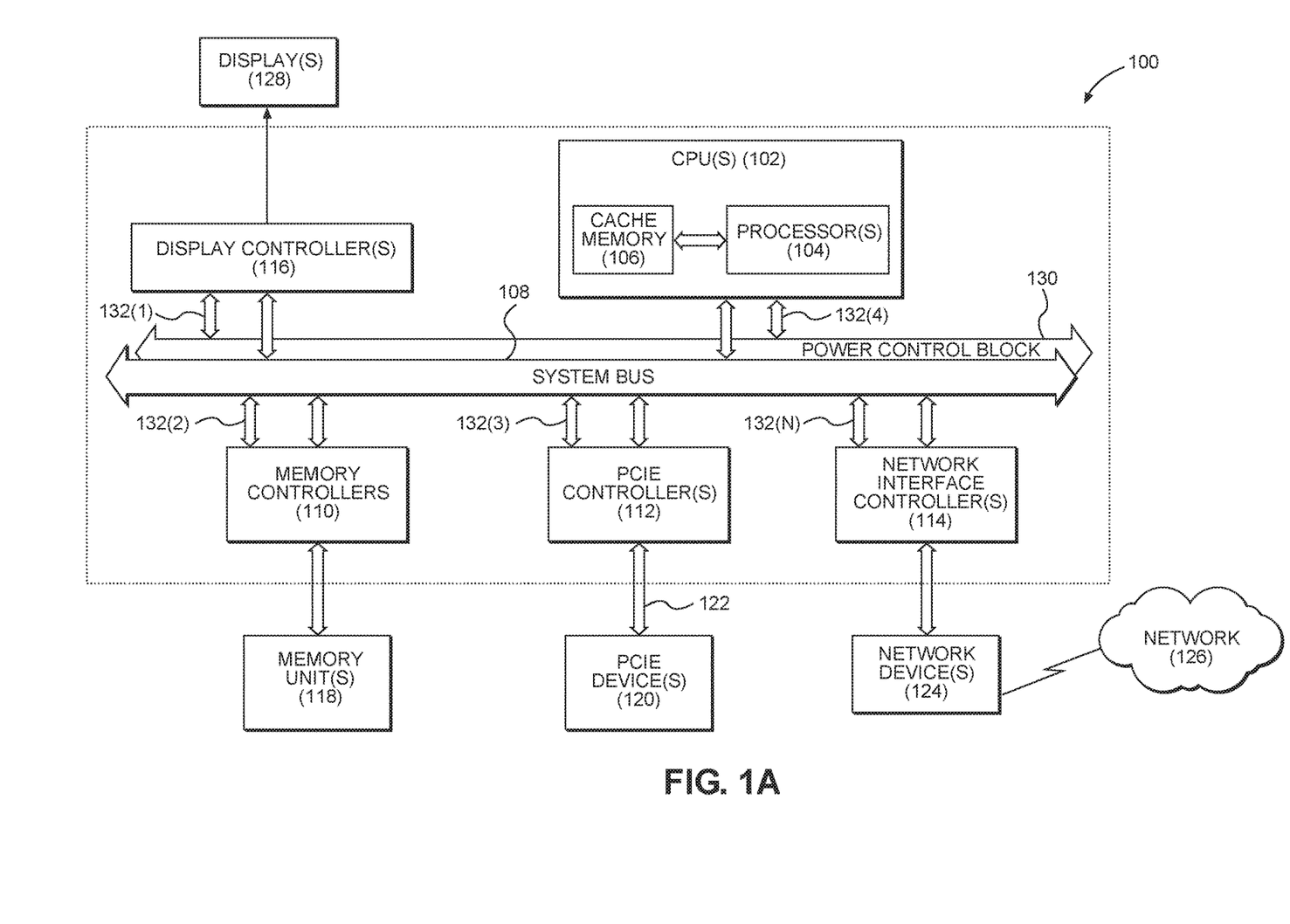
FIG. 1A is a block diagram of an exemplary computing device that may include a Peripheral Component Interconnect express (PCIE) link having asymmetric power states.

In this regard, FIG. 1A illustrates an example of a computing device, namely a processor-based system 100 that can employ PCIE termini able to operate in asymmetric power states or modes according to exemplary aspects of the present disclosure. In this example, the processor-based system 100 includes one or more central processing units (CPUs) 102, each including one or more processors 104. The CPU(s) 102 may have cache memory 106 coupled to the processor(s) 104 for rapid access to temporarily stored data. The CPU(s) 102 is coupled to a system bus 108 and can intercouple master and slave devices included in the processor-based system 100. As is well known, the CPU(s) 102 communicates with these other devices by exchanging address, control, and data information over the system bus 108. For example, the CPU(s) 102 can communicate bus transaction requests to one or more memory controllers 110. Although not illustrated in FIG. 1, multiple system buses 108 could be provided.

Other devices can be connected to the system bus 108. As illustrated in FIG. 1A, these devices can include (but are not necessarily limited to) the memory controller(s) 110, one or more PCIE controllers 112, one or more network interface controllers 114, and one or more display controllers 116, as examples. The memory controller(s) 110 may be coupled to one or more memory units 118. The PCIE controller(s) 112 may be coupled to one or more PCIE devices 120 through one or more PCIE links 122. The network interface controller(s) 114 may be coupled to one or more network devices 124. The network device(s) 124 can be any device configured to allow exchange of data to and from a network 126. The network 126 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 124 can be configured to support any type of communications protocol desired. In an exemplary aspect, the network interface device(s) 124 may be a mobile data modem (MDM) or other network device that allows the processor-based system 100 to communicate through one or more devices through a defined network protocol in a distributed or point-to-point fashion. Note also, that a CPU 102 may communicate with a peripheral device through such a distributed network.

The CPU(s) 102 may also be configured to access the display controller(s) 116 over the system bus 108 to control information sent to one or more displays 128. The display controller(s) 116 sends information to the display(s) 128 to be displayed via one or more video processors (not illustrated), which process the information to be displayed into a format suitable for the display(s) 128. The display(s) 128 can include any type of display, including, but not limited to, a liquid crystal display (LCD), a plasma display, a light emitting diode (LED) display, etc.

In addition to the system bus 108, there may be a power control block 130 that couples power to the various elements of the processor-based system 100 through power links 132(1)-132(N). The power control block 130 determines the overall system power based on votes from other subsystems or elements in the device. While not illustrated, there may be one or more clocks that provide clock signals to the various elements of the processor-based system 100. Some clocks may be internal to a specific element while other clocks may be provided by an external reference clock.

Figure 1B:
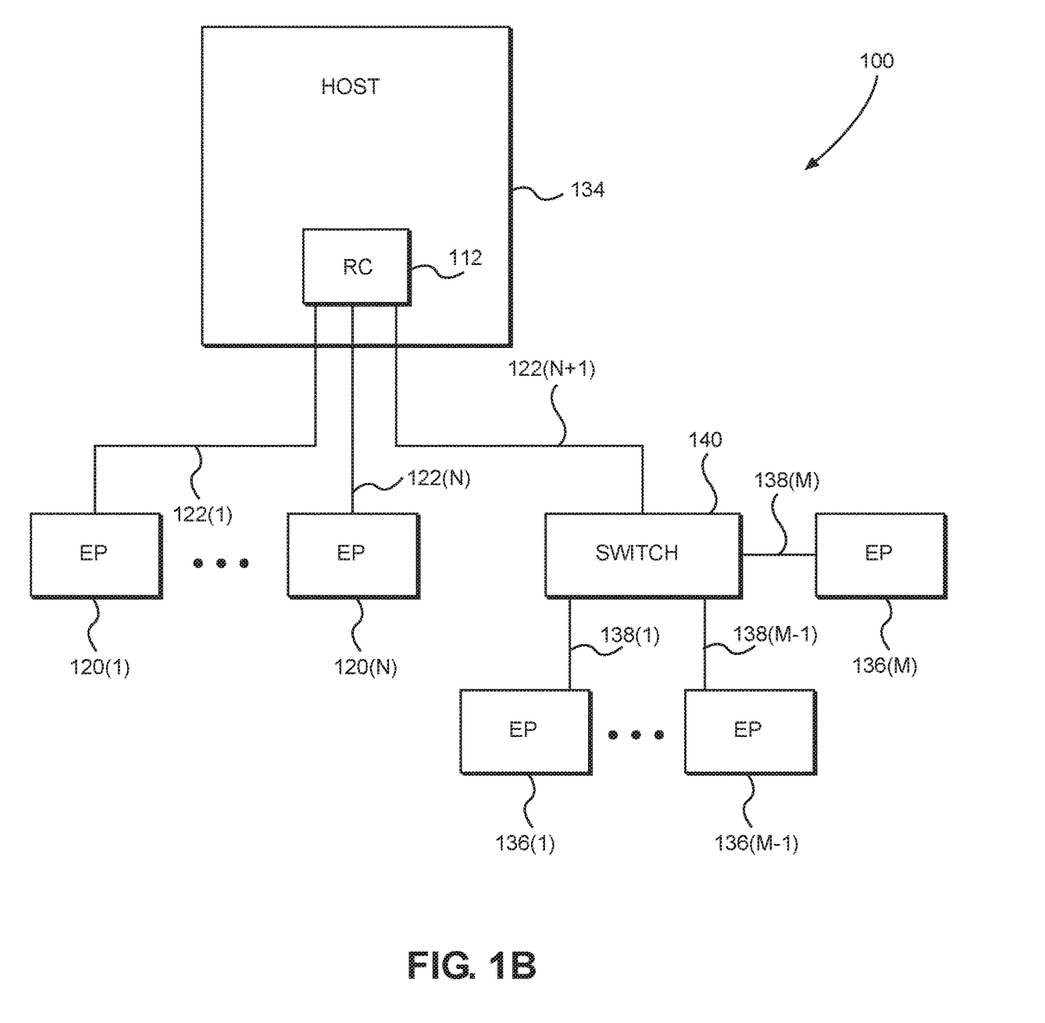
FIG. 1B is a block diagram of an exemplary computing system with devices coupled by PCIE links.

FIG. 1B illustrates the PCIE links 122 of the processor-based system 100 with a host 134, which may be an application processor, system on a chip (SoC), or the like. The host 134 includes the PCIE controller 112. The PCIE controller 112 is coupled to a plurality of devices 120(1)-120(N) directly and to a second plurality of devices 136(1)-136(M) through a switch 140. The PCIE controller 112 may be a PCIE root complex (RC) that is configured to couple to plural PCIE links 122(1)-122(N+1). The switch 140 communicates to the devices 136(1)-136(M) through PCIE links 138(1)-138(M). The devices 120(1)-120(N) and 136(1)-136(M) may be or may include PCIE endpoints.

In an exemplary aspect, the PCIE links 122(1)-122(N+1) and 138(1)-138(M) of FIG. 1B may be in a single computing device such as a computer with the host 134 being a central processing unit (CPU) and the devices 120(1)-120(N) and 136(1)-136(M) being internal components such as hard drives, disk drives, or the like. In a second exemplary aspect, the PCIE links 122(1)-122(N+1) and 138(1)-138(M) of FIG. 1B may be in a computing device where the host 134 is an integrated circuit (IC) on a board and the devices 120(1)-120(N) and 136(1)-136(M) are other ICs within the computing device. In a third exemplary aspect, the PCIE links 122(1)-122(N+1) and 138(1)-138(M) of FIG. 1B may be in a computing device having an internal host 134 coupled to external devices 120(1)-120(N) and 136(1)-136(M) such as a server coupled to one or more external memory drives. Note that these aspects are not necessarily mutually exclusive in that different ones of the devices may be ICs, internal, or external relative to a single host 134.

Figure 2:
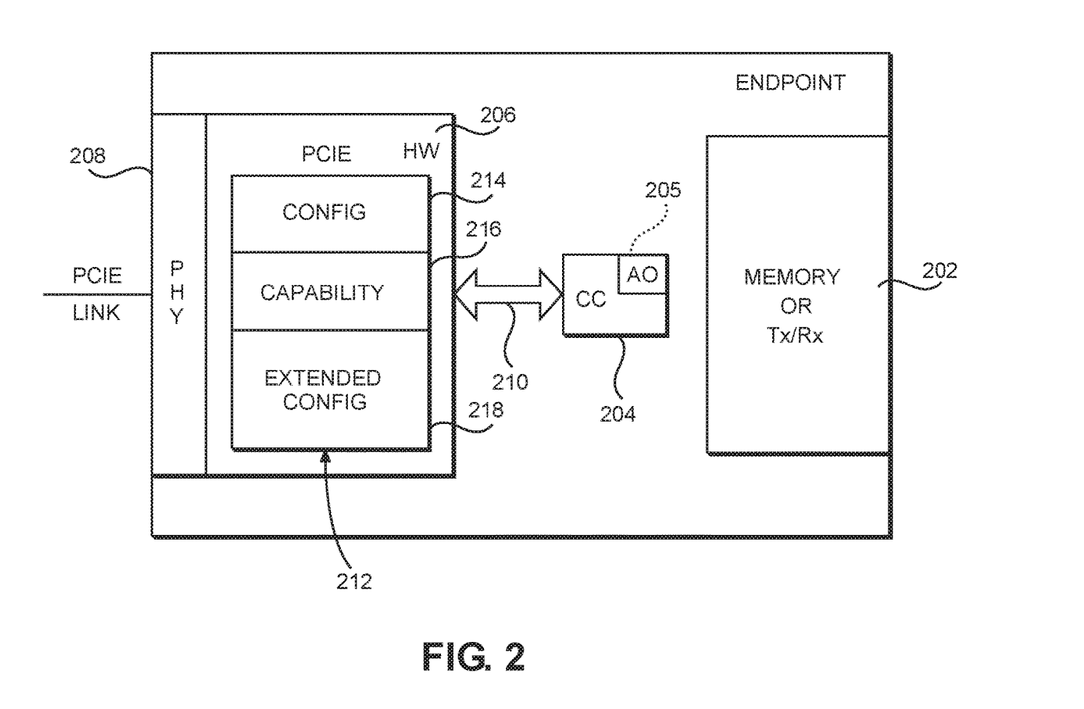
FIG. 2 illustrates a block diagram of an exemplary PCIE endpoint device and, particularly, configuration registers within the PCIE endpoint device.

FIG. 2 provides a block diagram of a device 200 that may be one of the devices 120(1)-120(N) or the devices 136(1)-136(M). In particular, the device 200 acts as an endpoint in a PCIE system, and may be, for example, a memory device that includes a memory element 202 and a control circuit 204 or an MDM that includes transceiver (Tx/Rx) circuitry configured to be coupled to an antenna for wireless communication (not shown). The control circuit 204 may include an "always on" (denoted AO in FIG. 2) circuit 205. Alternatively, the always on circuit 205 may communicate with the control circuit 204. Further, the device 200 includes a PCIE hardware (also denoted HW in FIG. 2) element 206 that includes a link or bus interface (sometimes referred to as a PCIE link interface or just PCIE interface) configured to couple to a PCIE link. The PCIE hardware element 206 may include a physical layer (PHY) 208 that is, or works with, the link or bus interface to communicate over the PCIE link. The control circuit 204 communicates with the PCIE hardware element 206 through a system bus 210. The PCIE hardware element 206 may further include a plurality of registers 212. The registers 212 may be conceptually separated into configuration registers 214 and capability registers 216. The configuration registers 214 and the capability registers 216 are defined by the original PCI standard, and more recent devices that include the registers 214 and 216 are backward compatible with legacy devices. The PCIE standard further defines additional registers found in a PCIE extended configuration register space 218. These registers did not exist in the original PCI standard, and thus, PCI legacy devices generally do not address these extra registers. While not shown explicitly, a timer may be present within the control circuit 204 or in the PCIE hardware element 206 that is used for exemplary aspects of the present disclosure.

Figure 3:
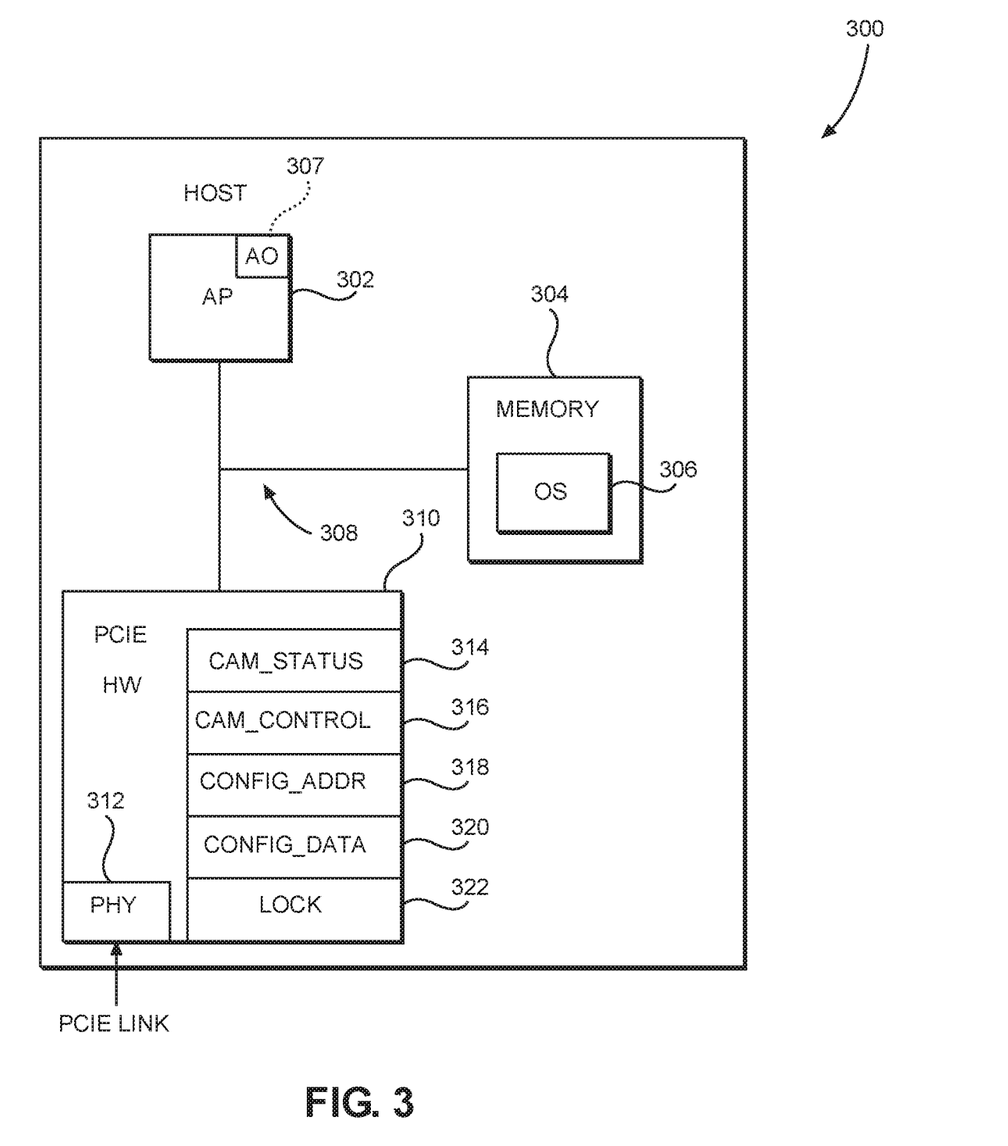
FIG. 3 illustrates a block diagram of a host having a processor and PCIE hardware with registers according to an exemplary aspect of the present disclosure.

Similarly, FIG. 3 illustrates a host 300. The host 300 may include an application processor 302 (which may be the CPU 102 of FIG. 1A) or other processor core or control circuit which communicates with a memory element 304 having an operating system 306 operating therewith. The application processor 302 may include an always on circuit 307 (denoted AO in FIG. 3). Alternatively, the always on circuit 307 may communicate with the application processor 302. A system bus 308 interconnects the application processor 302 with the memory element 304 and a PCIE RC (sometimes referred to as the PCIE hardware (HW)) 310. The PCIE RC 310 may include a PHY 312 that works with or is a link or bus interface (sometimes referred to as a PCIE link interface or just PCIE interface) configured to couple to a PCIE link. The PCIE RC 310 further includes a plurality of registers. In particular, the PCIE RC 310 may include a status register 314 (CAM_STATUS), a control register 316 (CAM_CONTROL), a configuration address register 318 (CONFIG_ADDR), and a data register 320 (CONFIG_DATA). Optionally, the plurality of registers may also include a lock register 322. These registers are defined by the PCIE standard and are not central to the present disclosure but are included for completeness. Again, while not shown explicitly, a timer may be present in the application processor 302, the PCIE RC 310, or between the device 200 and the PCIE RC 310 that is used for exemplary aspects of the present disclosure.

While the concepts of the present disclosure may be applied to other types of communication links, exemplary aspects of the present disclosure are well suited for use with the PCIE link(s) 122 of FIG. 1A. In particular, aspects of the present disclosure allow a PCIE terminus (e.g., the root complex or an endpoint) to enter an advanced low-power state. That is, while the PCIE standard defines link active state (L0) as being an active state and L1 as a low-power state, with L1.1 and L1.2 (generically link low-power state) as low-power substrates, even in these low-power substrates, the power domain (e.g., power rails) and clocks within a PCIE terminus are still active and may contribute leakage current or otherwise consume power. As this power consumption accelerates a need to recharge a battery or may increase a power bill, there is pressure to reduce power consumption. While the PCIE standard does contemplate an L2 or L3 low-power state, entry into the L2 or L3 state requires a substantial idle time and also requires a wakeup time in the order of milliseconds, which may negatively affect performance. Entry into the L2 or L3 state further requires coordination with the link partner. That is, entry into the L2 or L3 state is a synchronous coordinated effort requiring cooperation from both link partners, so if one end cannot enter the L2 or L3 state, then neither end can enter the L2 or L3 state. Further, not all devices enable the L2 or L3 state, and thus, the device may not enter a state where the power domain and clocks are turned off. Thus, more likely than not, the device may spend time in the link low-power state with an idle link. In such scenarios, the system is (in the absence of the present disclosure) unable to enter the lowest possible power state since the link low-power state maintains an active clock and power domain, preventing the device from entering power collapse. Accordingly, exemplary aspects of the present disclosure allow the PCIE terminus to enter an advanced low-power state where power consumption may be reduced, such as by reducing a clock frequency or allowing the power rail (e.g., power control block 130) and clocks to be scaled down or turned off. Note that these changes can be incremental. Initially, clock frequency may be reduced, then power rail output scaled, then the power rail turned off depending on how long the link remains idle. The precise order of the incremental power reductions may be varied as needed or desired. The PCIE terminus further allows rapid wakeups (e.g., on the order of microseconds) on receipt of a wakeup signal such as a clock request (variously referred to as CLKREQ or CLKREQ #, where the # denotes an active signal) signal at an always on block within the IC.

Figure 4:
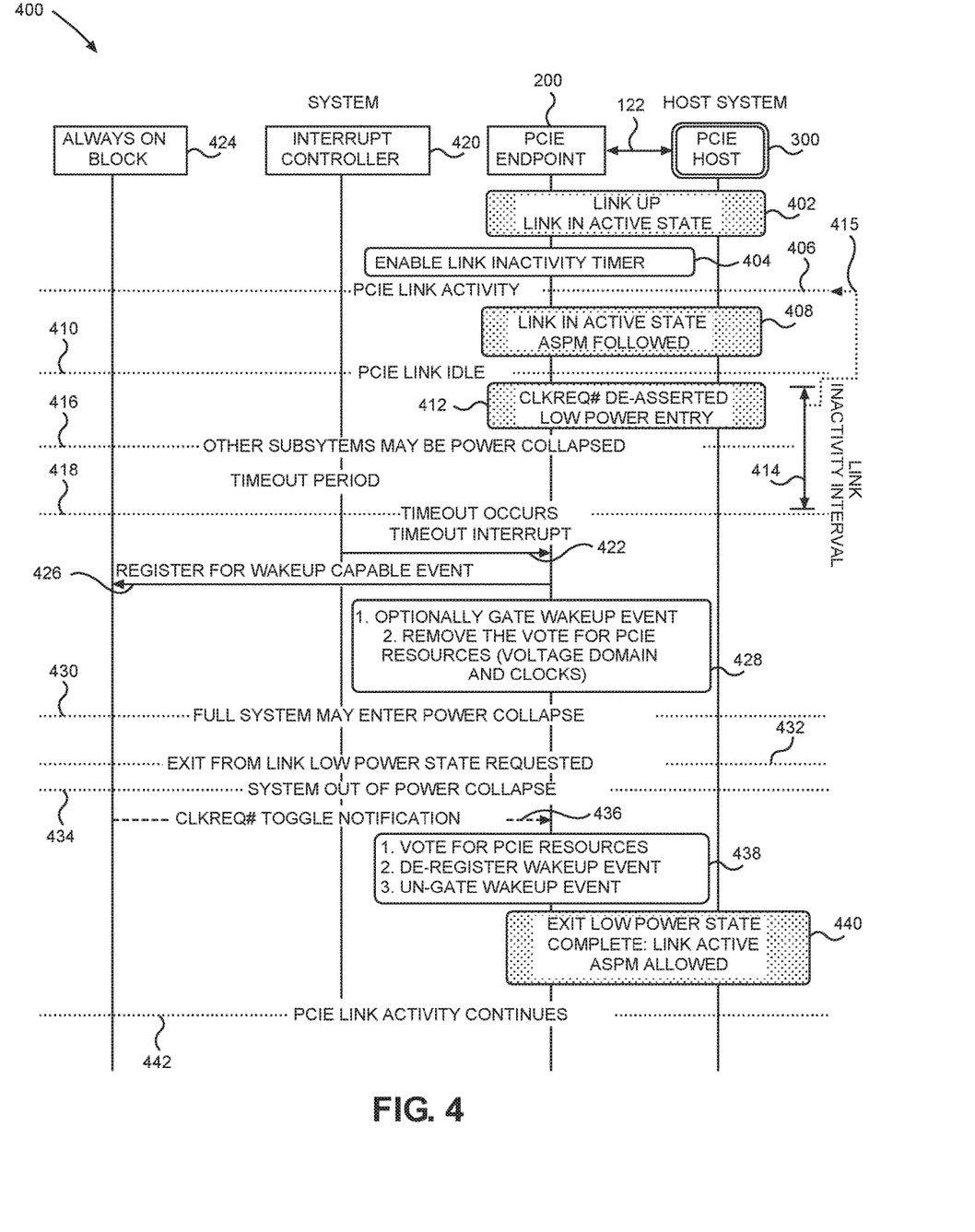
FIG. 4 is a sequence diagram of the steps associated with placing a PCIE terminus, and specifically a PCIE endpoint, in an advanced low-power state according to an exemplary aspect of the present disclosure.

FIG. 4 provides a sequence diagram 400 that explains entry into and exit from advanced system low-power states where at least an endpoint 200 enters such an advanced low-power state ranging from a different clock frequency up through a full power collapse. In this regard, FIG. 4 begins with a PCIE link 122 between a PCIE endpoint 200 and a PCIE host 300 (e.g., the termini of the PCIE link) being up and in the link active (L0) state (block 402). The various capability registers have previously indicated to the PCIE host 300 that low-power states such as L1ss are available, and the termini enable a link inactivity timeout interrupt by enabling a link inactivity timer (block 404). While there is PCIE link activity (line 406), the PCIE link 122 remains active and in the link active state (block 408). Note that while in the active state, the PCIE link 122 may be governed by the PCIE standard and, particularly, the Active State Power Management (ASPM) rules, which allow the PCIE link 122 to enter and exit low-power states based on activity on the PCIE link 122. That is, the ASPM rules are followed.

Note that the PCIE specification mandates that the CLKREQ # signal should be supported as a bi-directional open drain signal by both the root complex and the endpoint ports of the link that are connected to each other for supporting the link low-power state. Exit from the link low-power state is initiated, per the PCIE specification, when the CLKREQ # signal is asserted. Exemplary aspects of the present disclosure use this function as explained herein, but other signals could be used.

At some point, the PCIE link 122 becomes idle (line 410), and the CLKREQ # signal is de-asserted by the endpoint 200 to allow entry into a link low-power state (e.g., L1 or L1ss) (block 412). As noted above, entry into and exit from the link low-power states are defined by the PCIE standard (e.g., ASPM). A link inactivity timer at the endpoint 200 is enabled having a threshold equal to a link inactivity interval (vertical line 414). Note that it is possible that activity resumes on the PCIE link 122 before expiration of the link inactivity timer, and the PCIE link 122 returns to activity (denoted generally by dotted line 415). However, during the link low-power state, other subsystems within the endpoint 200 may be idle and power may be partially collapsed (e.g., the CPU) (line 416), although typically the clocks and power domain remain active. If the PCIE link 122 stays in the link low-power state (without exiting) for the period of the timer (i.e. time denoted by line 414), a link inactivity timeout occurs (line 418). An interrupt controller 420, which may be in the endpoint 200, (or other interrupt controller subsystem) issues a link inactivity timeout interrupt to the endpoint 200 (line 422), and the endpoint 200 registers with an always on block 424, which may be the always on circuit 205, for a wakeup signal (e.g., CLKREQ # signal (or other signal (or event) that acts as a link activity notification mechanism)) to act as a wakeup capable interrupt (line 426) or trigger.

Having registered the endpoint 200 (CLKREQ #) as wakeup capable, the PCIE subsystem within the endpoint 200 removes the vote for PCIE resources in the power control block 130 (block 428). This vote may include removal of the vote for the power domain and clocks, and may optionally gate the CLKREQ # to the PCIE controller. This vote removal allows full system power collapse for at least the endpoint 200, where the power domain and clocks are turned off (line 430), scaled down, or otherwise lowered (e.g., sufficient power for memory retention may be maintained). One way in which scaling down may occur is by changing the clock frequency.

At some subsequent time, a CLKREQ # toggle notification is detected within the host 300, and this toggle notification is treated as a request from one of the link partners to exit from the link low-power state (line 432). The endpoint 200 wakes up and exits power collapse such that the endpoint 200 is out of power collapse (line 434). After exiting power collapse, the always on block 424 sends a CLKREQ # (or other wakeup signal) toggle notification to the PCIE host 300 (line 436). The host 300 then votes for PCIE resources (e.g., the voltage rails and clocks) and de-registers the CLKREQ # interrupt (or other wakeup signal) (block 438). Additionally, the host 300 votes for PCIE resources and un-gates the CLKREQ # to the PCIE controller (if such was enabled at block 428). The PCIE terminus exits the link low-power state and the PCIE link 122 goes to a link active state (e.g., L0) with ASPM allowed (block 440) where PCIE link activity continues (line 442) allowing normal entry into and exit from active and low-power states. Note that entry into and exit from the advanced low-power state may occur autonomously, without coordination with the other terminus. Note that the threshold for the timer may be set based on expected activity or use cases on the PCIE link 122.

Figure 5:
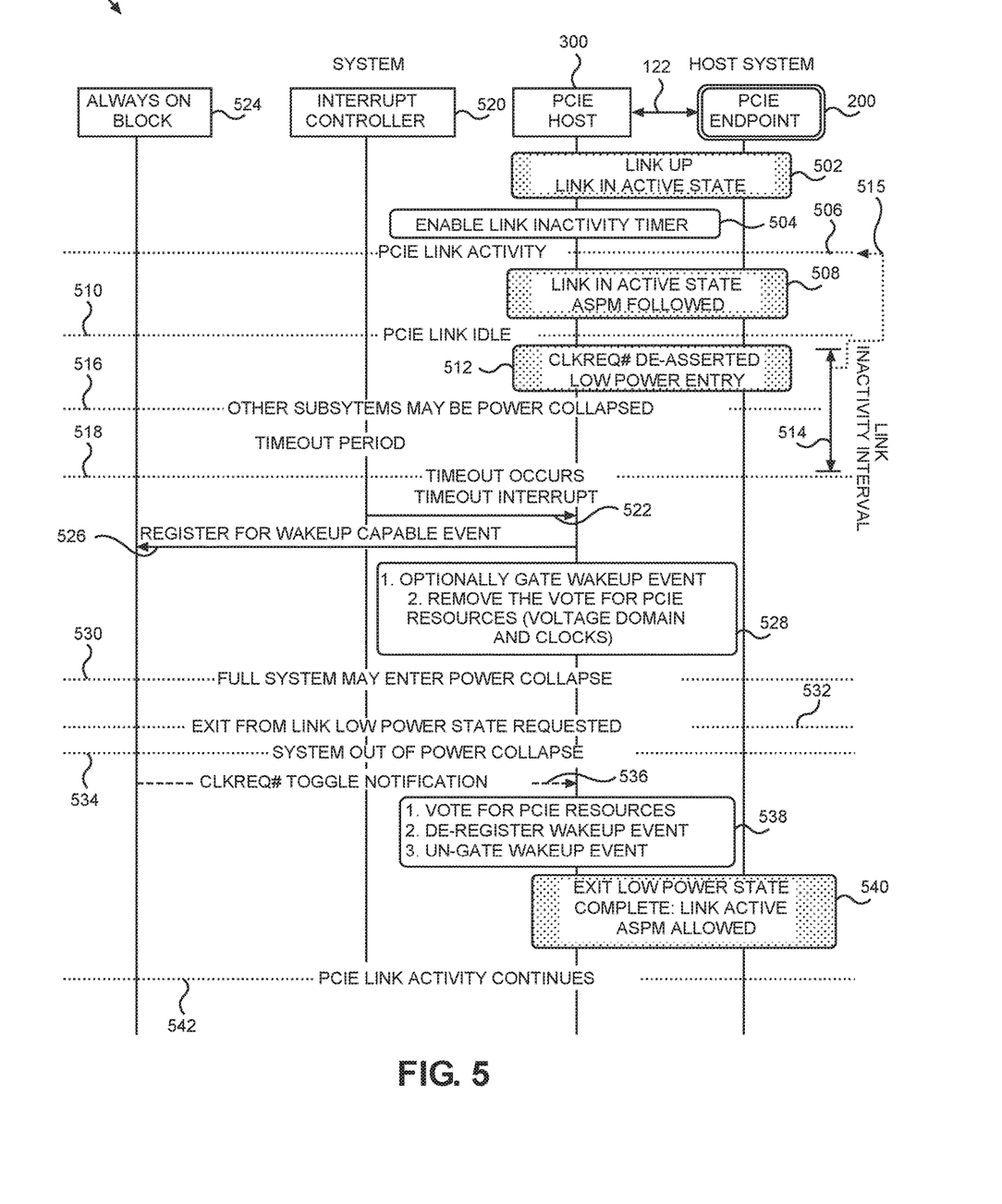
FIG. 5 is a sequence diagram of the steps associated with placing a PCIE terminus, and specifically a PCIE host, in an advanced low-power state according to exemplary aspect of the present disclosure.

FIG. 5 provides a sequence diagram 500 that explains entry into and exit from advanced system low-power states where at least the host 300 enters such an advanced low-power state ranging from a different clock frequency up through a full power collapse. In this regard, FIG. 5 begins with a PCIE link 122 between a PCIE endpoint 200 and a PCIE host 300 (e.g., the termini of the PCIE link) being up and in the link active (L0) state (block 502). The various capability registers have previously indicated to the PCIE host 300 that low-power states such as L1ss are available, and the endpoint 200 enables a link inactivity timeout interrupt by enabling a link inactivity timer (block 504). While there is PCIE link activity (line 506), the PCIE link 122 remains active and in the link active state (block 508). Note that while in the active state, the PCIE link 122 may be governed by the PCIE standard and, particularly, the ASPM rules, which allow the PCIE link 122 to enter and exit low-power states based on activity on the PCIE link 122. That is, the ASPM rules are followed.

At some point, the PCIE link 122 becomes idle (line 510), and the CLKREQ # signal is de-asserted by the host 300 to allow entry into a link low-power state (e.g., L1 or L1ss) (block 512). As noted above, entry into and exit from the link low-power states are defined by the PCIE standard (e.g., ASPM). A link inactivity timer at the host 300 is enabled having a threshold equal to a link inactivity interval (vertical line 514). Note that it is possible that activity resumes on the PCIE link 122 before expiration of the link inactivity timer, and the PCIE link 122 returns to activity (denoted generally by dotted line 515). However, during the link low-power state, other subsystems within the host 300 may be idle and power may be partially collapsed (line 516), although typically the clocks and power domain remain active. If the PCIE link 122 stays in the link low-power state (without exiting) for the period of the timer (i.e. time denoted by line 514), a link inactivity timeout occurs (line 518). An interrupt controller 520, which may be in the host 300, (or other interrupt controller subsystem) issues a link inactivity timeout interrupt to the endpoint 200 (line 522), and the endpoint 200 registers with an always on block 524, which may be the always on circuit 307, for a wakeup signal (e.g., CLKREQ # signal (or other signal (or event) that acts as a link activity notification mechanism)) to act as a wakeup capable interrupt (line 526) or trigger.

Having registered the host 300 (CLKREQ #) as wakeup capable, the PCIE subsystem within the endpoint 200 removes the vote for PCIE resources in the power control block 130 (block 528). This vote may include removal of the vote for the power domain and clocks, and may optionally gate the CLKREQ # to the PCIE controller. This vote removal allows full system power collapse for at least host 300, where the power domain and clocks are turned off (line 530), scaled down, or otherwise lowered (e.g., sufficient power for memory retention may be maintained). One way in which scaling down may occur is by changing the clock frequency.

At some subsequent time, a CLKREQ # toggle notification is detected within the host 300, and this toggle notification is treated as a request from one of the link partners to exit from the link low-power state (line 532). The host 300 wakes up and exits power collapse such that the host 300 is out of power collapse (line 534). After exiting power collapse, the always on block 524 sends a CLKREQ # (or other wakeup signal) toggle notification to the endpoint 200 (line 536). The host 300 then votes for PCIE resources (e.g., the voltage rails and clocks) and de-registers the CLKREQ # interrupt (or other wakeup signal) (block 538). Additionally, the host 300 votes for PCIE resources and un-gates the CLKREQ # to the PCIE controller (if such was enabled at block 528). The PCIE terminus exits the link low-power state and the link goes to a link active state (e.g., L0) with ASPM allowed (block 540) where PCIE link activity continues (line 542) allowing normal entry into and exit from active and low-power states. Note that entry into and exit from the advanced low-power state may occur autonomously, without coordination with the other terminus. Note that the threshold for the timer may be set based on expected activity or use cases on the PCIE link 122.

The systems and methods for power management for PCIE-based devices according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a FPGA or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A method for reducing power consumption for a Peripheral Component Interconnect express (PCIE) terminus, comprising:
   after entry into a low-power state, starting a timer;
   receiving a link inactivity timeout interrupt at expiration of a period of the timer;
   registering with an always on circuit for a wakeup signal to act as a wakeup capable interrupt;
   removing a vote for resources in a power control block; and
   entering at least a partial system power collapse at the PCIE terminus without notifying another PCIE terminus, wherein entering at least the partial system power collapse comprises scaling down power from at least one power domain while maintaining sufficient power for memory retention.

2. The method of claim 1, wherein registering for the wakeup signal comprises registering for a CLKREQ # signal as the wakeup capable interrupt.

3. The method of claim 1, wherein the low-power state comprises an L1 substrate (L1ss).

4. The method of claim 1, wherein entering at least the partial system power collapse further comprises turning off at least one clock within the PCIE terminus.

5. The method of claim 4, wherein entering at least the partial system power collapse comprises scaling down the power from the at least one power domain after turning off the at least one clock and wherein turning off the at least one clock occurs after reducing a clock frequency of the at least one clock.

6. The method of claim 1, wherein scaling down the power from the at least one power domain comprises scaling down an output from the at least one power domain.

7. The method of claim 1, further comprising, after entering at least the partial system power collapse, receiving the wakeup signal.

8. The method of claim 7, wherein receiving the wakeup signal comprises receiving a CLKREQ # signal.

9. The method of claim 7, further comprising waking up from at least the partial system power collapse after receiving the wakeup signal.

10. A device comprising a root complex, the root complex comprising:
    a Peripheral Component Interconnect express (PCIE) interface configured to be coupled to a PCIE link;
    a timer; and
    a control circuit configured to:
      after entry into a low-power state, start the timer;
      receive a link inactivity timeout interrupt at expiration of a period of the timer;
      register with an always on circuit for a wakeup signal to act as a wakeup capable interrupt;
      remove a vote for resources in a power control block; and
      enter at least a partial system power collapse without notifying another PCIE terminus associated with the PCIE link by scaling down power from at least one power domain while maintaining sufficient power for memory retention.

11. The device of claim 10, further comprising a clock, wherein the control circuit is further configured to turn off the clock prior to scaling down the power from the at least one power domain when entering at least the partial system power collapse.

12. The device of claim 10, wherein the control system is further configured to enter at least the partial system power collapse incrementally, initially by reducing a clock frequency and then scaling down the power from the at least one power domain, and finally by entering a full system power collapse.

13. The device of claim 10, wherein the control circuit is further configured to, after entering at least the partial system power collapse, receive the wakeup signal.

14. The device of claim 10 integrated into an apparatus selected from the group consisting of: a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

15. A device comprising an endpoint, the endpoint comprising:
a Peripheral Component Interconnect express (PCIE) interface configured to be coupled to a PCIE link;
a timer; and
a control circuit configured to:
after entry into a low-power state, start the timer;
receive a link inactivity timeout interrupt at expiration of a period of the timer;
register with an always on circuit for a wakeup signal to act as a wakeup capable interrupt;
remove a vote for resources in a power control block; and
enter at least a partial system power collapse without notifying another PCIE terminus associated with the PCIE link by scaling down power from at least one power domain while maintaining sufficient power for memory retention.

16. The device of claim 15, further comprising a clock, wherein the control circuit is further configured to turn off the clock when entering at least the partial system power collapse prior to scaling down the power from the at least one power domain.

17. The device of claim 15, wherein the control system is further configured to enter at least the partial system power collapse incrementally, initially by reducing a clock frequency and then scaling down the power from the at least one power domain, and finally by entering a full system power collapse.

18. The device of claim 15, wherein the control circuit is further configured to, after entering at least the partial system power collapse, receive the wakeup signal.

19. The device of claim 15 integrated into an apparatus selected from the group consisting of: a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

* * * * *